WILLIAM STARK, JOSEPH G. FISHER, & SIMEON FITCH.
Improvement in Apparatus for Feeding and Watering Stock in Cars.
No. 121,214.            Patented Nov. 21, 1871.

UNITED STATES PATENT OFFICE.

WILLIAM STARK, OF WHITE PIGEON, MICHIGAN, AND JOSEPH G. FISHER AND SIMEON FITCH, OF TOLEDO, OHIO.

IMPROVEMENT IN APPARATUS FOR FEEDING AND WATERING STOCK IN CARS.

Specification forming part of Letters Patent No. 121,214, dated November 21, 1871.

*To all whom it may concern:*

Be it known that we, WILLIAM STARK, of White Pigeon, St. Joseph county, Michigan, and JOSEPH G. FISHER and SIMEON FITCH, of Toledo, in the county of Lucas and in the State of Ohio, have invented certain new and useful Improvements in Apparatus for Feeding and Watering Stock in Cars; and do hereby declare that the following is a full, clear, and exact description thereof, reference being had to the accompanying drawing making part of this specification, in which—

Figure 1:
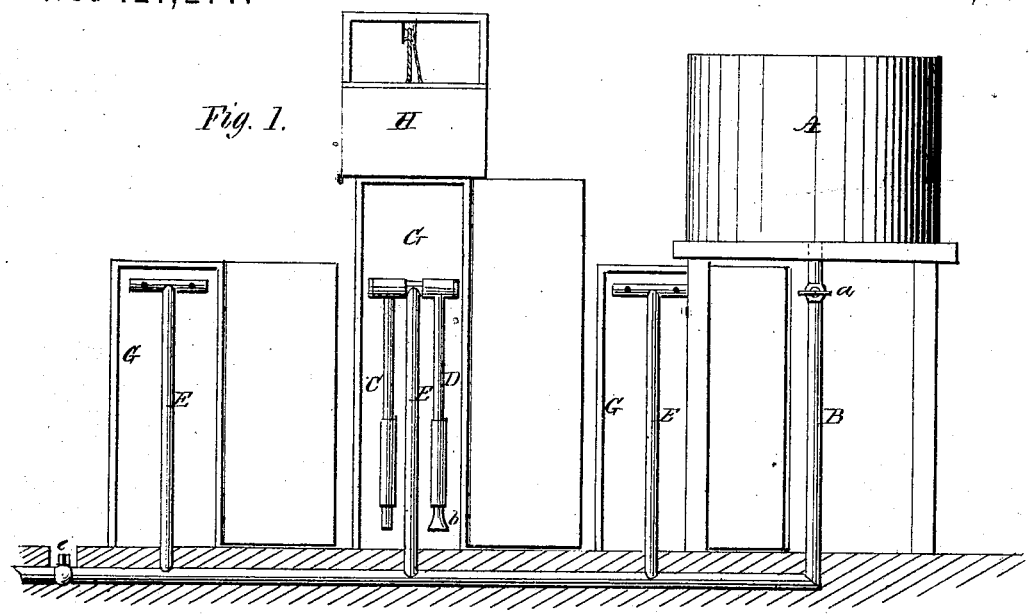
Figure 2:
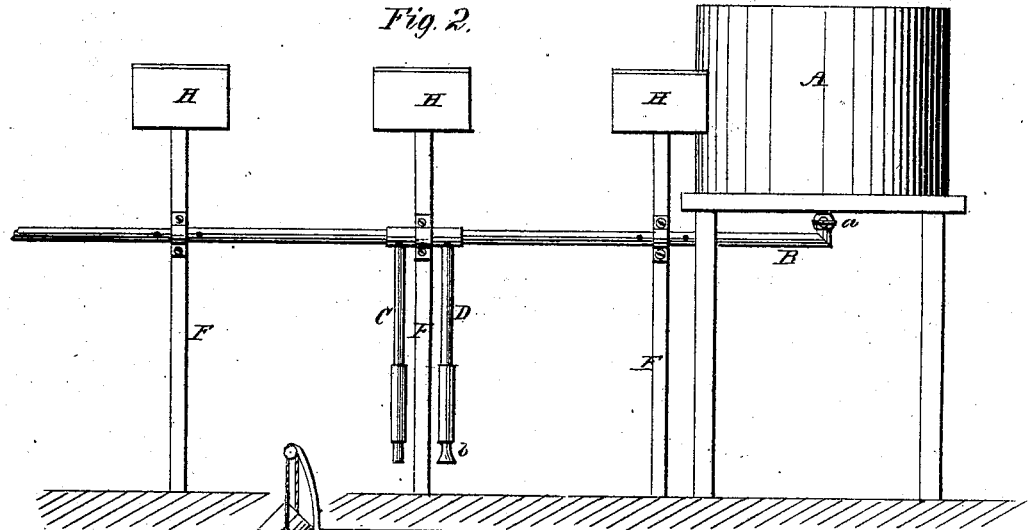
Figure 3:
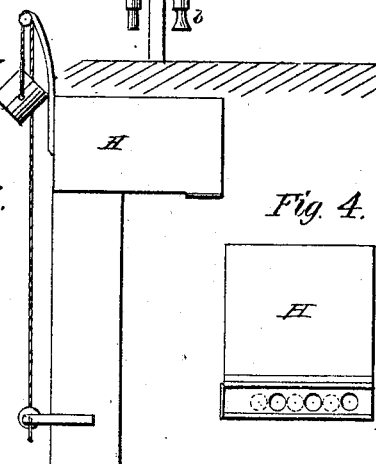
Figure 4:
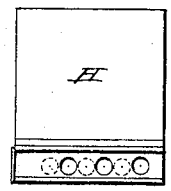

Figure 1 represents a side elevation of our device; Fig. 2, a similar elevation with a modification of the arrangement of the main water-pipe; Fig. 3, a side elevation of one of the boxes and grain-bins; and Fig. 4, a plan view of the bottom of one of the grain-bins.

Like letters of like kind represent corresponding parts in each figure.

The object of our invention is an improved method of supplying water and food to stock-cars upon railways and for showering the animals in said cars; and it consists in a system of pipes leading from an elevated reservoir along by the side of the railway the length of an ordinary cattle-train, and supplied at convenient distances with branch pipes in a system of elevated bins situated in like manner with the water-reservoirs, and supplied with suitable spouts; and in the construction, combination, and arrangement of the various parts employed for the above-named purposes, all as more fully hereinafter described.

In the drawing, A represents an elevated water-reservoir such as is commonly in use upon the lines of railways; B, a pipe leading from said reservoir for the purpose of taking the water, which pipe may have a suitable stop-cock or valve, *a*. This pipe may lead down from the reservoir to the ground, or into the ground a sufficient depth to be out of the way of travel or to be protected from the frost, and then be carried along by the side of the railway far enough to supply water to a whole train; or the pipe may be carried along above the ground at any convenient distance. Branch pipes C are connected with the main pipe at proper distances apart, preferably so as to bring at least one opposite to each car in the train, for the purpose of filling the water-vessels in each car, and other branch pipes D are placed near the water branch pipes just mentioned for the purpose of showering the animals in the car, which last pipes are provided with sprinklers *b;* or a single branch pipe may be used for both purposes, the sprinkler being removable. One description of pipe, shown in the drawing, is partly rigid and partly flexible, and is pivoted in such a manner that when it hangs down by its own weight the flow of water through such pipe is stopped, and when it is raised from the vertical position the flow commences. Branch pipes of other construction, however, would operate effectually. When these branch pipes thus described are used in connection with a main pipe upon or in the ground the water flows from such main pipe into the branches through a stand-pipe, E, which rises a sufficient height above the ground; but when the main pipe is carried along above the ground no such stand-pipes are, of course, required, but in their stead it will be necessary to use proper standards or posts F for support. When the main pipe is employed upon or in the ground it will be found convenient to have boxes G to cover and protect the stand and branch pipes, which boxes may be provided with doors for security. A suitable stop-cock or valve, *e*, at the outer end of the main pipe, and provided with a proper lever for operating it when below the ground, suffers all the water in the pipes to escape, so as to avoid all danger of freezing in the winter. Grain-bins H are placed upon the boxes G, or within the tops of said boxes when the boxes are used, or upon the standards or posts F, which bins are provided with suitable valves to permit or prevent the exit of the grain, and with spouts to convey it to the cars. They should be placed high enough above the ground to permit the grain to flow from them to the top of a car and have covers to protect their contents from injury. To raise the grain to these bins any proper pulley or other contrivance may be used, and it will be found convenient, also, to employ for this purpose a bucket or scoop, which by contact with a detent will be tilted and empty itself into said bins.

The mode of operation of our device is so far implied from the foregoing that no further description seems necessary.

Among the advantages of our method and the machinery by which it is operated are the following: Although there are inventions covering the carrying of water and feed for stock upon the cars, it follows, of necessity, that no great quantity of either can be taken along, and the trains must stop often to replenish, which consumes a great deal of time. Again, in such cars there is danger of the freezing of the water and the bursting of the pipes in severely-cold weather. By our method the stock in a train can be watered and supplied with food in a few minutes, while the train is standing upon the track, by the ordinary attendants, and such as require it may also be showered, and the freezing and bursting of pipes is avoided.

This method is also equally well adapted for the use of the cars described which carry water-tanks and grain-bins.

Having thus described our invention and enumerated some of its advantages, what we claim as new therein, and our own invention, is—

1. A system of pipes or tubes having suitable connections with reservoirs or other sources of supply, and arranged for the simultaneous supply of food or water to the cars of a stock train, substantially as set forth.

2. The combination of the elevated reservoir A, the main pipe B, and the branch pipes C or D, substantially as described, for the purposes set forth.

3. The combination of the series of grain-bins H and the boxes G or standards F, constructed and arranged substantially as described, for the purposes set forth.

In testimony that we claim the foregoing we have hereunto set our hands.

WILLIAM STARK.
     JOSEPH G. FISHER.
Witnesses:  SIMEON FITCH.
 GEO. S. PRINDLE,
 JOHN R. YOUNG.
Witnesses as to FISHER and FITCH:
 J. K. HAMILTON,
 R. A. DURFEE.    (120)